United States Patent [19]

Howie, Jr.

[11] Patent Number: 4,604,786
[45] Date of Patent: Aug. 12, 1986

[54] METHOD OF MAKING A COMPOSITE ARTICLE INCLUDING A BODY HAVING A DECORATIVE METAL PLATE ATTACHED THERETO

[75] Inventor: Robert K. Howie, Jr., Decatur, Ill.
[73] Assignee: The Grigoleit Company, Decatur, Ill.
[21] Appl. No.: 683,329
[22] Filed: Dec. 19, 1984

Related U.S. Application Data

[63] Continuation of Ser. No. 439,347, Nov. 5, 1982, abandoned.

[51] Int. Cl.⁴ .................. B21D 39/00; B23P 11/00
[52] U.S. Cl. .................. 29/513; 10/27 PH; 24/96; 59/77; 72/324; 72/379; 156/664; 200/340
[58] Field of Search .......... 29/513, 432, 558; 10/27 PH, 86 C; 72/324, 379; 24/36, 96, 101 B; 59/72, 77; 411/477; 156/664; 74/553; 200/340, 308; 400/490–493, 493.1

[56] References Cited

U.S. PATENT DOCUMENTS

| | | | |
|---|---|---|---|
| 247,088 | 9/1881 | Maynz | 24/96 UX |
| 300,204 | 6/1884 | Brainard | 59/79 |
| 1,497,339 | 6/1924 | McCann | 29/513 |
| 1,511,355 | 10/1924 | Morrison | 59/72 UX |
| 1,837,720 | 12/1931 | Luce et al. | 10/86 C UX |
| 1,846,007 | 2/1932 | Levine | 29/513 X |
| 2,981,610 | 4/1961 | Snyder et al. | 156/664 X |
| 3,410,349 | 11/1968 | Troutman | 29/513 X |
| 3,648,394 | 3/1972 | Hepner | 400/493.1 X |
| 4,000,597 | 1/1977 | Burton | 29/513 X |
| 4,281,446 | 8/1981 | Umeno | 29/513 X |
| 4,293,754 | 10/1981 | Komaki | 200/340 |

Primary Examiner—Charlie T. Moon
Attorney, Agent, or Firm—Kinzer, Plyer, Dorn & McEachran

[57] ABSTRACT

A method of manufacturing a composite article including a hollow body having a decorative metal plate attached thereto. The method includes the forming of a decorative metal plate and the attachment of the plate to a hollow body. The method can be best described by its application to the manufacture of a push button which involves the following: Forming a rectangular sheet of aluminum which sheet has at least one decorative brushed surface. Machining the brushed aluminum surface of the aluminum sheet in an annular pattern around the perimeter of the sheet to remove a uniform thickness of the aluminum thereby leaving a central rectangular island of brushed aluminum. The central rectangular island thus formed is surrounded on all sides by the machined surface which functions as an apron around the island. All of the machined surface apron on both long sides of the rectangular island is removed leaving tabs of apron extending from the opposite short ends of the rectangular island. The tabs are bent away from the brushed aluminum surface so that they extend at generally right angles to the brushed aluminum surface of the island. The metal plate thus formed is attached to the plastic shell by inserting the tabs into passages formed in one end of the plastic shell while positioning the island against the plastic shell. The tabs are crimped to lock the aluminum plate to the plastic shell to complete the push button.

5 Claims, 5 Drawing Figures

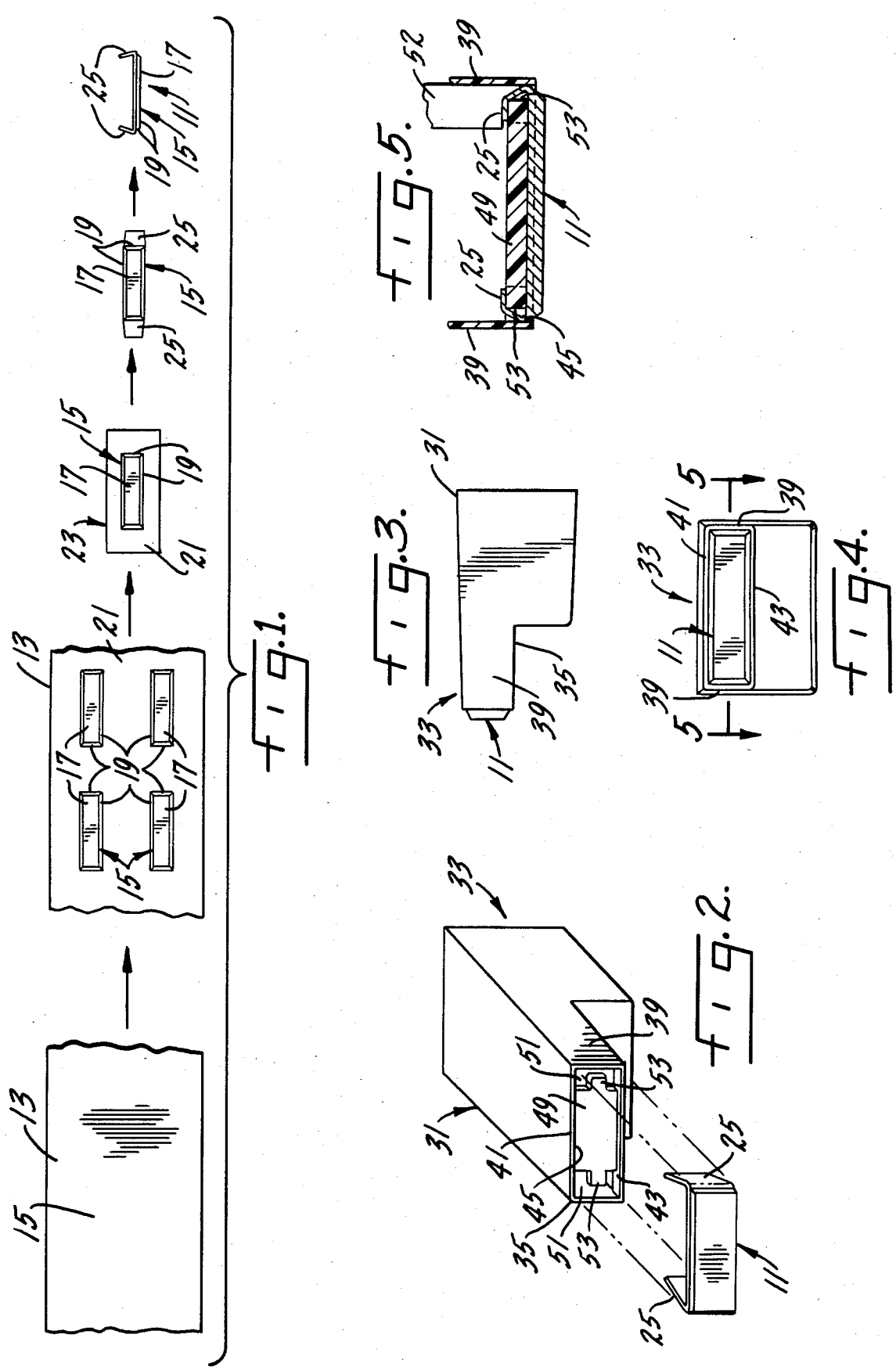

METHOD OF MAKING A COMPOSITE ARTICLE INCLUDING A BODY HAVING A DECORATIVE METAL PLATE ATTACHED THERETO

This application is a continuation of application Ser. No. 439,347, filed Nov. 5, 1982, now abandoned.

BACKGROUND AND SUMMARY OF THE INVENTION

This invention is directed to a composite article including a hollow body having a decorative metal plate attached thereto. Although my invention is suitable for the manufacture of almost any composite article, for clarity of illustration, it will be described as it is applied to a push button having a decorative metal finger contacting plate and to the manner of making the push button by attaching a decorative metal plate to a hollow plastic body. When applied to a push button or similar item, it is particularly concerned with attaching a small decorative metal plate to a hollow plastic body in order to manufacture a small push button for a tape recorder, radio, stereo unit and the like. Conventionally, decorative metal plates have been attached to plastic bodies by adhesives to form push buttons. However, the assembly of such an item has been difficult because of the small size of the metal plates. Also, handling the plate with the adhesive thereon was not convenient. Further, even when the decorative plate was properly assembled to the plastic body, it has frequently fallen off during use because of failure of the adhesive.

An object of this invention is a method of making a metal plate and attaching it to a hollow body to make a composite article.

Another object of this invention is a method of making a decorative metal end plate which can be attached to a plastic body to form a push button of the type which can be used for a radio, a tape recorder, a stereo unit and like items.

Another object of this invention is a method of attaching a decorative metal plate to a plastic body without using an adhesive.

Another object of this invention is to manufacture a decorative metal end plate which can be attached to a plastic body by crimping.

Another object of this invention is a method of manufacturing a decorative metal end plate having integral tabs for attachment of the plate to a plastic body.

Other objects may be found in the following specification, claims and drawings.

BRIEF DESCRIPTION OF THE DRAWINGS

The invention is illustrated more or less diagrammatically in the following drawings wherein:

FIG. 1 is a schematic view showing the steps of manufacturing a decorative end plate from a sheet of decorative metal.

FIG. 2 is an exploded view showing the method of assembling the decorative end plate on a hollow plastic body.

FIG. 3 is a side elevational view of the completed push button.

FIG. 4 is a front elevational view of the push button of FIG. 3.

FIG. 5 is an enlarged partial cross sectional view taken along line 5—5 of FIG. 4.

DESCRIPTION OF THE PREFERRED EMBODIMENT

My invention can be utilized in the manufacture of composite articles of many types in which a metal plate is attached to a hollow body. The hollow body may be formed of metal but usually will be made of a suitable plastic. For clarity and conciseness of explanation, my invention will be described in detail as it is applied to the manufacture of a push button having a hollow plastic body and a decorative, finger engaging end plate although my invention is not limited to the manufacture of an item of this type.

FIG. 1 of the drawings shows the steps of making a decorative metal plate 11 from a sheet of metal 13 which, in this case, is a sheet of aluminum having a decorative brushed surface 15. The sheet is depicted as rectangular but this is only by way of example and not limitation since other shapes of sheets may be used. A suitable brushed aluminum plate will have a thickness of approximately 0.040 inches. As shown in the second step, the brushed surface 15 is machined to form rectangular islands 17 of brushed aluminum having beveled edges 19 surrounded by an apron created by a machined surface 21. While four islands 17 are depicted, it should be apparent that any convenient number could be machined at one time, even only one. The apron is machined to a thickness of approximately 0.008 inches.

The decorative metal sheet 13 having the rectangular islands 17 of brushed aluminum is then cut into a number of individual rectangular sheets 23, each having a rectangular island 17 of brushed aluminum surrounded on all sides by the machined surface 21 which forms the apron.

The next step in the method of my invention involves the removing of the machined surface apron 21 on both long sides of the rectangular island 17 leaving tabs 25 of apron extending from the opposite short ends of the rectangular island 17. Of course, it should be appreciated that the tabs could be formed on the long sides of the islands. Also, if the islands are not rectangular, then the tabs could be located so that they are generally opposite each other.

In the last step shown in the right hand side of FIG. 1, the tabs 25 are bent away from their machined surface to extend generally at right angles to the brushed aluminum surface 15 of the island 17. For ease of installation, the tabs are bent somewhat beyond 90° from their original position.

The decorative metal plate 11 thus formed is attached to the finger contacting surface of a hollow plastic body 31 to form a push button 33.

The hollow plastic body 31 is of generally rectangular transverse cross section and has a forwardly extending cantilevered portion 35 also of rectangular cross section with side walls 39, a top wall 41 and a bottom wall 43 framing an open end 45. A plate support member 49 is located inwardly of the open end 45 and extends between the top and bottom walls 41 and 43 of the cantilevered portion leaving passages 51 on opposite sides between the plate support 49 and the side walls 39. Ears 53 may extend from the support plate into the passages 51.

In assembling the decorative metal plate 11 to the hollow plastic body 31 to form the finished push button 33, the tabs 25 are inserted into the passages 51 with the plate engaging the plate support 49. A tool having one or two fingers 52 is inserted into the hollow plastic body from the rear thereof engaging the tabs and forcing the tabs beneath the ears 53 of the support plate as shown in FIG. 5 of the drawings. For a more secure fit, the tabs may be also bent or crimped on the sides of the ears by the crimping tool.

The completed push button 33 has a permanently attached decorative metal end plate 11. Due to the manner of attachment of the decorative plate to the plastic body, the plate is highly resistant to accidental disengagement. The use of tabs 25 which are thinner than the remainder of the decorative metal plate facilitates the bending of the tabs and provides an ease of attachment of the tabs to the plate support 49.

From the foregoing description of one embodiment of my invention, it should be apparent that my invention can be utilized in the manufacture of composite articles of various shapes and sizes. Therefore, the scope of my invention should be determined only by a broad interpretation of the claims appended hereto.

I claim:

1. A method of manufacturing a composite article including a body having a decorative metal plate attached thereto, the method including the steps of:
    selecting a metal sheet having at least one decorative surface,
    machining the decorative surface of the metal sheet to remove a uniform thickness of metal and leave a central island of metal with a decorative surface surrounded on all sides by the machined surface which defines an apron around the island,
    removing some of the machined surface apron leaving tabs of apron attached to the island,
    bending the tabs away from the machined surface to extend at generally right angles to the decorative surface of the island,
    inserting the tabs in openings extending through a surface of the body while positioning the decorative plate against the surface of the body, and
    bending the tabs to lock the decorative plate to the body by means of a tool located on the opposite side of the surface of the body to which the plate is attached.

2. The method of claim 1 further characterized in that:
    the metal sheet having at least one decorative surface is a rectangular sheet of aluminum,
    the decorative surface is a brushed surface,
    the central island with the decorative metal surface formed by the machining is a rectangular island having a surface of brushed aluminum,
    the tabs of apron extend from opposite sides of the rectangular island, and
    the body is formed of plastic having openings extending through one surface thereof and the tabs of the decorative aluminum plate are inserted in these openings while the decorative plate is positioned against this surface.

3. A method of manufacturing a metal plate having integral tabs to be attached to a body by inserting the tabs into slots extending through a surface of the body and bending the tags into locking engagement with the body, the method including the steps of:
    selecting a metal sheet having a decorative surface,
    machining the decorative surface of the sheet to remove a uniform thickness of metal from the sheet, thereby leaving a central island with a decorative surface having the thickness of the original sheet with the island surrounded on all sides by an apron of the thinner machined surface, and
    removing the annular apron around some of the island leaving oppositely located tabs extending from the island.

4. The method of claim 3 including the further step of:
    bending the tabs away from the decorative surface of the island to extend generally at right angles to this surface.

5. The method of claim 3 in which:
    the metal plate is an aluminum plate,
    the metal plate is rectangular in shape,
    the decorative surface is a brushed surface,
    the central island is rectangular in shape, and
    the oppositely located tabs extend from opposite sides of the rectangular island.

* * * * *